(12) United States Patent
Moon et al.

(10) Patent No.: US 9,381,488 B2
(45) Date of Patent: Jul. 5, 2016

(54) MICROCHANNEL REACTOR FOR HYDROCARBON REFORMING

(71) Applicant: KOREA INSTITUTE OF SCIENCE AND TECHNOLOGY, Seoul (KR)

(72) Inventors: Dong Ju Moon, Seoul (KR); Seung Won Jeon, Gyeonggi-do (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 367 days.

(21) Appl. No.: 13/909,714

(22) Filed: Jun. 4, 2013

(65) Prior Publication Data

US 2014/0140896 A1 May 22, 2014

(30) Foreign Application Priority Data

Nov. 21, 2012 (KR) ........................ 10-2012-0132548

(51) Int. Cl.
*B01J 19/00* (2006.01)
(52) U.S. Cl.
CPC .... *B01J 19/0093* (2013.01); *B01J 2219/00783* (2013.01); *B01J 2219/00835* (2013.01); *B01J 2219/00873* (2013.01)

(58) Field of Classification Search
CPC .................................................. B01J 19/0093
See application file for complete search history.

(56) References Cited

U.S. PATENT DOCUMENTS

| | | | | |
|---|---|---|---|---|
| 5,811,062 A * | 9/1998 | Wegeng et al. | ................ | 422/129 |
| 6,159,434 A * | 12/2000 | Gonjo et al. | ................ | 422/626 |
| 6,447,736 B1 * | 9/2002 | Autenrieth et al. | ........... | 422/601 |
| 7,695,694 B2 * | 4/2010 | Bowe et al. | ................... | 422/643 |
| 7,857,874 B2 * | 12/2010 | Kihara et al. | ................ | 48/127.9 |
| 8,123,825 B2 * | 2/2012 | Yagi et al. | .......................... | 48/61 |
| 8,585,990 B2 * | 11/2013 | Moon et al. | ................... | 422/603 |
| 2002/0071797 A1 * | 6/2002 | Loffler | ................. | B01J 37/0248 422/600 |
| 2004/0148859 A1 * | 8/2004 | Kawamura et al. | .......... | 48/127.9 |
| 2004/0187386 A1 * | 9/2004 | Wangerow et al. | .......... | 48/198.3 |

FOREIGN PATENT DOCUMENTS

| | | |
|---|---|---|
| JP | 2008-194593 A | 8/2008 |
| KR | 1019950006785 B1 | 3/1995 |
| KR | 1020040080918 A | 10/2004 |
| KR | 1020060086062 A | 9/2006 |
| KR | 1020060123665 A | 12/2006 |
| KR | 1020100042107 A | 5/2010 |

OTHER PUBLICATIONS

Junke Xu, et al; "Biogas reforming for hydrogen production over a Ni-Go bimetallic catalyst: Effect of operating conditions", International Journal of Hydrogen Energy, vol. 35, pp. I3013-I3020; Available online May 21, 2010.

* cited by examiner

*Primary Examiner* — Matthew Merkling
(74) *Attorney, Agent, or Firm* — Ladas & Parry LLP

(57) ABSTRACT

Disclosed is a microreactor for hydrocarbon reforming, including an end plate, a combustion catalyst plate, a combustion channel plate, a reforming catalyst plate and a reforming channel plate, wherein a plurality of combustion catalyst-filled parts are present in a portion of an entire combustion catalyst plate and a plurality of combustion catalyst-unfilled parts are present in a remaining portion.

2 Claims, 3 Drawing Sheets

MICROCHANNEL REACTOR FOR HYDROCARBON REFORMING

CROSS-REFERENCE TO RELATED APPLICATIONS

This application claims priority under 35 U.S.C. §119 to Korean Patent Application No. 10-2012-0132548, filed on Nov. 21, 2012, in the Korean Intellectual Property Office, the disclosure of which is incorporated herein by reference in its entirety.

BACKGROUND (a) Technical Field

The present invention relates to a microreactor, more particularly to temperature control inside the reactor and improvement of reaction rate and reforming performance thereby.

(b) Background Art

Hydrogen is widely used in petroleum and chemical industries mainly to produce ammonia through reaction with nitrogen. It is also used to obtain methyl alcohol through reaction with carbon monoxide and for cracking or desulfurization of heavy oil in petrochemistry. Recently, hydrogen is used as a reactant in the Fischer-Tropsch synthesis whereby a liquid fuel is synthesized from coal, natural gas or biomass. Also, hydrogen is an ideal fuel for a polymer electrolyte membrane fuel cell (PEMFC).

The main pathways for hydrogen production are thermal, electrochemical or biological. Among these methods, the thermal method, specially steam methane reforming, is the most economical, effective and widely used method. The steam methane reforming is accompanied by water-gas shift and reverse methanation reactions. Each reaction is as follows.

Reaction Formula 1

$CH_4 + H_2O \leftrightarrow CO + 3H_2, \Delta H_{298} = 206$ kJ/mol     1.

$CO + H_2O \leftrightarrow CO_2 + H_2, \Delta H_{298} = -41$ kJ/mol     2.

$CH_4 + 2H_2O \leftrightarrow CO_2 + 4H_2, \Delta H_{298} = 164$ kJ/mol     3.

Since the steam methane reforming and reverse methanation reactions are endothermic reactions and the reaction rate of the water-gas shift reaction is relatively low, supply of heat from outside is required to continue the reactions. The reaction rate is also limited by the transfer of materials and heat inside the reactor. Accordingly, use of microchannels that have a large surface area per unit volume and thus exhibit superior transfer of materials and heat in a reactor is studied. An advantage of the microreactor is that it can be integrated with a heat exchanger. By doing so, heat can be supplied directly by inducing an exothermic reaction such as catalytic combustion of methane at the opposite side of a channel where the endothermic reaction occurs.

The reaction formula for the catalytic combustion of methane is as follows.

Reaction Formula 2

$CH_4 + 2O_2 \rightarrow CO_2 + 2H_2O, \Delta H_{298} = -802$ kJ/mol     1.

Control of temperature distribution inside the microreactor where the exothermic and endothermic reactions occur at the same time is of great importance. The reactor temperature is determined by the reaction rate of the endothermic or exothermic reaction and, conversely, the reaction of each reaction is greatly affected by the temperature. That is to say, the reaction rate and the temperature are closely related with each other.

The steam methane reforming and the catalytic combustion of methane exhibit different features in reaction rate. The reaction rate and temperature of the catalytic combustion of methane increase rapidly once the reaction is activated and the reaction is limited by mass transfer. Accordingly, the catalytic combustion of methane is already completed near the inlet of the microreactor. In contrast, the steam methane reforming proceeds relatively slowly and it is not completed with a conversion rate of 100% even at the outlet. Accordingly, if a catalyst is filled or coated throughout a combustion catalyst plate in the reactor as in the existing art, as shown in FIG. 1, the catalytic combustion of methane is terminated before the heat generated during the combustion is effectively transferred to the endothermic, reforming reaction and the heat remaining without being transferred to the reforming reaction rapidly increases the temperature in the reactor locally.

*International Journal of Hydrogen Energy* 37(2012) 13013 addressed the hot-spot problem of local temperature increase near the inlet of a microreactor where the steam methane reforming reaction for production of hydrogen and the catalytic combustion of methane for supply of heat occur adjacently owing to the difference in the heat of the endothermic and exothermic reactions based on computational analysis.

The high reactor temperature may result in deteriorated catalytic performance through thermal deactivation of the catalyst known as sintering and increases the possibility of detachment of the coated catalyst increases if the reactor is operated at high temperature. In addition, the high temperature and temperature gradient cause deterioration of reactor durability and increase deformation due to thermal stress.

Korean Patent Application No. 10-2006-0086062 discloses a device capable of reducing non-uniformity of temperature of a plurality of reactors while maintaining each reactor at a uniform temperature, wherein a long reaction flow channel is formed such that the temperature of the entire reaction flow channel is maintained constant and a heating part is provided between the plurality of reactors to uniformly heat them.

Korean Patent Application No. 10-1995-0006785 discloses a methanol reforming apparatus in which a reforming tube defined by coaxially arranged inner and outer cylinders filled with a reforming catalyst is provided to improve thermal efficiency by lowering operation temperature of the reforming apparatus as much as possible and to realize optimum combustion condition and temperature distribution, wherein a plurality of combustion catalyst layers of a honeycomb structure are installed inside the inner cylinder of the reforming tube, a fuel supply pipe is installed at the center of the combustion catalyst layer and a fuel vaporizing coil is installed inside the reforming tube to be connected with the reforming tube.

Korean Patent Application No. 10-2010-0042107 discloses a micro-macrochannel reactor to solve the problems of non-uniform distribution of reactants, pressure increase and deterioration of reaction activity caused by pressure change, which includes an upper end plate and a lower end plate engaged externally; a heat exchanging plate passing heat exchanging materials through a flow channel so as to perform heat exchange between the heat exchanging materials and reactants, products or a mixture that passing through a catalyst plate; the catalyst plate stacked with the heat exchanging plate and including a catalyst part accommodating a catalyst required for reaction such that the catalytic reaction occurs while the reactants pass through the catalyst part; and a supporting plate stacked with the catalyst plate and providing a flow channel so that the reactants can pass through the catalyst part of the catalyst plate, wherein the heat exchanging plate, the catalyst plate and the supporting plate are stacked between the upper end plate and the lower end plate.

Korean Patent Application No. 10-2004-0080918 discloses a system wherein hydrocarbons and air for combustion are mixed at thin plates so as to generate local heat for combustion and induce temperature increase such that combustion at a reactant inlet can be prevented and calories required for heating can be generated uniformly on the whole surface of the reactor.

In other words, the existing hydrocarbon reforming reactor for production of hydrogen has the hot-spot problem of local temperature increase caused by the difference in the heat of the endothermic, reforming reaction and the exothermic, catalytic combustion.

Throughout the specification, a number of publications and patent documents are referred to and cited. The disclosure of the cited publications and patent documents is incorporated herein by reference in its entirety to more clearly describe the state of the related art and the present invention.

SUMMARY

The present invention is directed to providing a reactor capable of controlling the rate of a catalytic combustion, effectively transferring heat generated therefrom to a reforming reaction and reducing rapid temperature change in the reactor by disposing a catalyst non-uniformly in a combustion catalyst plate for control of the catalytic combustion which tends to be quickly completed at the inlet.

As described above, if a catalyst is filled or coated throughout combustion catalyst plates 13, 17 in a reactor as in the existing art, as shown in FIG. 1, the catalytic combustion of methane is terminated before the heat generated during the combustion is effectively transferred to the endothermic, reforming reaction and the heat remaining without being transferred to the reforming reaction rapidly increases the temperature in the reactor locally. In order to solve this problem, the present invention is directed to providing a microreactor capable of controlling the rate of the catalytic combustion of methane, reducing rapid temperature change in the reactor and, thus, ensuring stable continuation of the reforming reaction and the combustion by disposing a catalyst non-uniformly in the combustion catalyst plate of the microreactor.

In an aspect, the present invention provides a microreactor for hydrocarbon reforming including an end plate and one or more unit consisting of a combustion catalyst plate, a combustion channel plate, a reforming catalyst plate, and a reforming channel plate, wherein a plurality of combustion catalyst-filled parts are present in a portion of the entire combustion catalyst plate and a plurality of combustion catalyst-unfilled parts are present in a remaining portion. In another aspect, the present invention provides a microreactor wherein a filling amount of the combustion catalyst can be varied for different locations of the combustion catalyst-filled part. The filling amount can be controlled depending on required heat. The microreactor can be used not only for a reforming reaction of a hydrocarbon including methane but also for an endothermic reaction and an exothermic reaction that occur simultaneously.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

A microreactor of the present invention may be used for reforming of hydrocarbons including methane and may also be used as a microreactor for performing an endothermic reaction and an exothermic reaction simultaneously.

Figure 1:
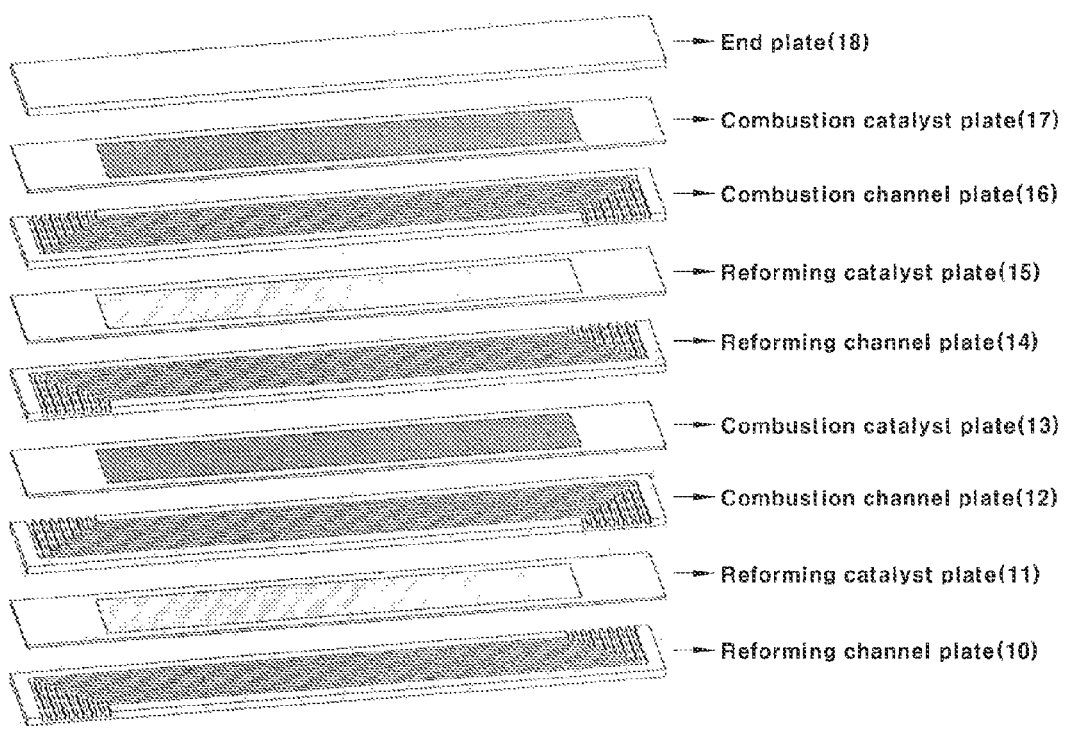
FIG. 1 shows an existing microreactor, wherein two units with each unit consisting of a combustion catalyst plate, a combustion channel plate, a reforming catalyst plate and a reforming channel plate are stacked. The plates can be stacked with one or more unit and an end plate is stacked on the topmost combustion catalyst plate. In the existing microreactor, a combustion catalyst is filled or coated throughout the plate.

Usually, a combustion part and a reforming part of a microreactor include, as the existing reactor shown in FIG. 1, an end plate 18, a combustion catalyst plate 17, a combustion channel plate 16, a reforming catalyst plate 15, a reforming channel plate 14, a combustion catalyst plate 13, a combustion channel plate 12, a reforming catalyst plate 11 and a reforming channel plate 10, which are stacked and assembled. The dots uniformly filled in the combustion catalyst plates 17, 13 represent that a combustion catalyst is filled or coated throughout the plate.

Figure 2:
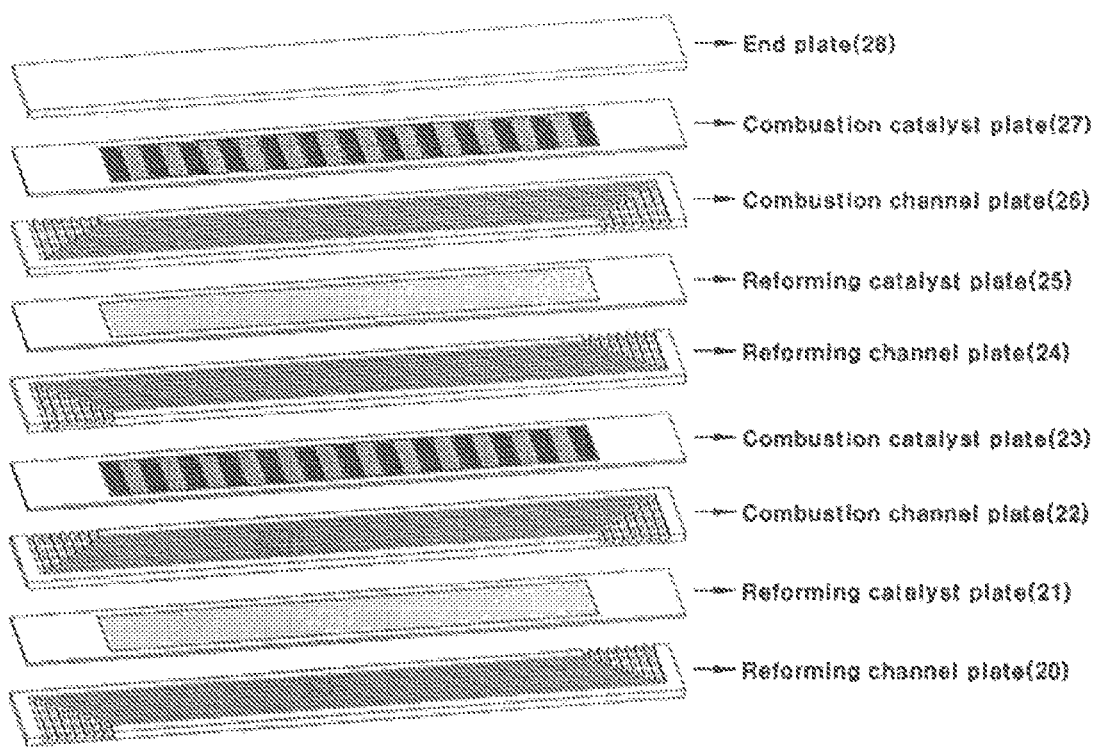
FIG. 2 shows a microreactor of the present invention, wherein a plurality of combustion catalyst-filled parts are formed linearly from a reactant inlet to a product outlet perpendicularly to a flow direction of reactants and a plurality of combustion catalyst-unfilled parts exist alternatingly with the combustion catalyst-filled parts.

In the microreactor of the present invention as shown in FIG. 2, the part filled with dots in the combustion catalyst plate 23, 27 is defined as a combustion catalyst-filled part and the part shaded light gray is defined as a combustion catalyst-unfilled part. A plurality of combustion catalyst-filled parts may be formed linearly from a reactant inlet to a product outlet perpendicularly to a flow direction of reactants and a plurality of combustion catalyst-unfilled parts may exist alternatingly with the combustion catalyst-filled parts.

Also, a plurality of combustion catalyst-filled parts may be formed linearly from a reactant inlet to a product outlet in parallel with a flow direction of reactants and a plurality of combustion catalyst-unfilled parts may exist alternatingly with the combustion catalyst-filled parts.

Figure 3:
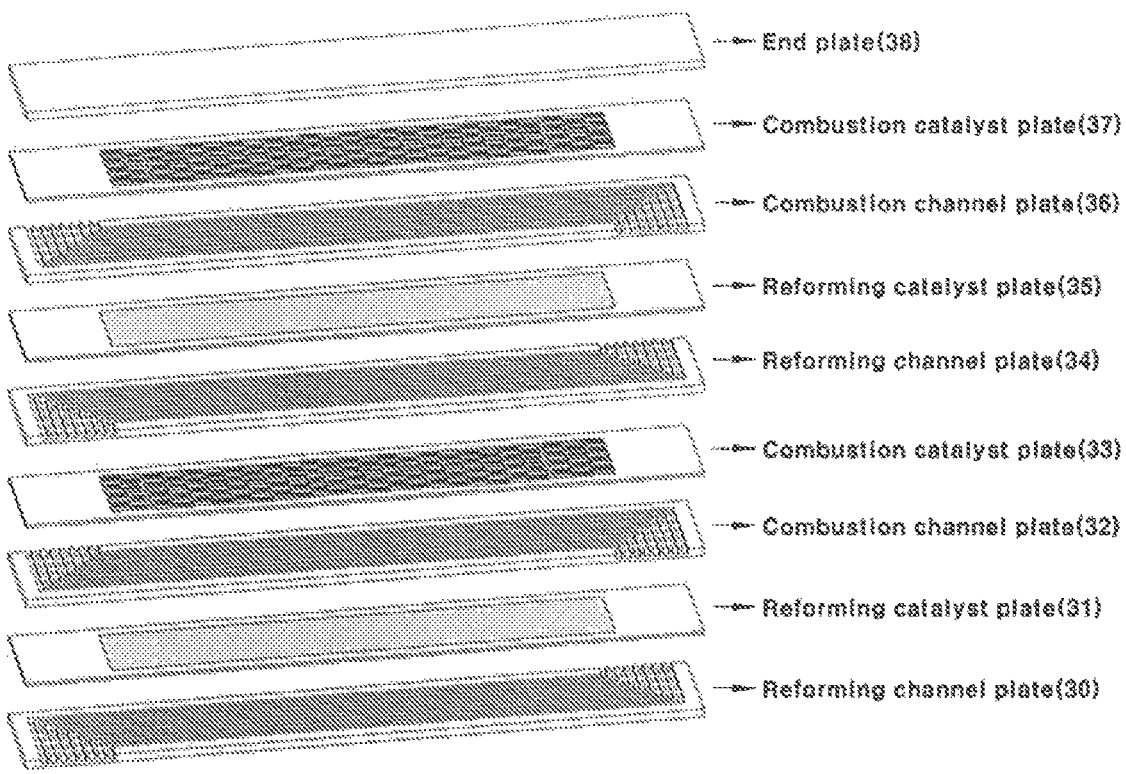
FIG. 3 shows a microreactor of the present invention, wherein a plurality of combustion catalyst-filled parts and a plurality of combustion catalyst-unfilled parts exist alternatingly from a reactant inlet to a product outlet with a lattice shape.

Also, in the microreactor of the present invention shown in FIG. 3, the part filled with dots in the combustion catalyst plate 37, 33 is defined as a combustion catalyst-filled part and the part shaded light gray is defined as a combustion catalyst-unfilled part. A plurality of combustion catalyst-filled parts and a plurality of combustion catalyst-unfilled parts may exist alternatingly from a reactant inlet to a product outlet with a lattice shape.

A catalyst filling amount of the combustion catalyst-filled parts may be controlled depending on required heat. The microreactor of the present invention may be used for reforming of hydrocarbons including methane and may also be used as a microreactor for performing an endothermic reaction and an exothermic reaction simultaneously.

EXAMPLES

The present invention will be described in more detail through examples for methane. In the present invention, a catalyst filling amount of combustion catalyst-filled parts may be controlled depending on required heat. The microreactor of the present invention may be used for reforming of hydrocarbons including methane and may also be used as a microreactor for performing an endothermic reaction and an exothermic reaction simultaneously. The following examples are for illustrative purposes only and it will be apparent to those skilled in the art not that the scope of this invention is not limited by the examples.

Example 1

A combustion catalyst was filled such that a plurality of combustion catalyst-filled parts are formed on a combustion catalyst plate linearly from a reactant inlet to a product outlet perpendicularly to a flow direction of reactants and a plurality of combustion catalyst-unfilled parts exist alternatingly with the combustion catalyst-filled parts. The entire length of the reactor was 50 mm and the width of combustion catalyst-filled parts and the combustion catalyst-unfilled parts was 2 mm. There were 13 combustion catalyst-filled parts and 12 combustion catalyst-unfilled parts. Pt and Ni were used respectively as a combustion catalyst and a reforming catalyst. Operation pressure was 1 bar, inlet temperature was 893 K and inflow rate at a combustion channel and a reforming channel was 3.1 m/s and 4 m/s, respectively. 9% (vol %) of methane mixed in air was introduced into the combustion channel and a mixture of methane and steam (1:3) was introduced into the reforming channel. Methane conversion rate was calculated based on the amount of the products carbon monoxide and carbon dioxide at a reforming channel outlet.

Example 2

In the setup of Example 1, 3 combustion catalyst-filled parts and 3 combustion catalyst-unfilled parts with a width of 2 mm were disposed from the inlet to a length of 12 mm, after which the catalyst was filled to the outlet.

Comparative Example 1

A combustion catalyst was filled such that the combustion catalyst is present throughout a combustion catalyst plate. The entire length of the reactor was 50 mm. Pt and Ni were used respectively as a combustion catalyst and a reforming catalyst. Operation pressure was 1 bar, inlet temperature was 893 K and inflow rate at a combustion channel and a reforming channel was 3.1 m/s and 4 m/s, respectively. 9% (vol %) of methane mixed in air was introduced into the combustion channel and a mixture of methane and steam (1:3) was introduced into the reforming channel. Methane conversion rate was calculated based on the amount of the products carbon monoxide and carbon dioxide at a reforming channel outlet.

Temperature at the inlet, middle portion and outlet of the plate was measured and temperature gradient and highest temperature were determined therefrom. Also, methane conversion rate was calculated. The result is shown in Table 1. The reactor temperature increased rapidly near the inlet to the highest temperature and then decreased gradually toward the outlet.

TABLE 1

|  | Example 1 | Example 2 | Comparative Example 1 |
| --- | --- | --- | --- |
| Inlet temperature (K) | 893 | 893 | 893 |
| Highest temperature (K) | 1115 | 1119 | 1192 |
| Temperature at middle portion of plate (K) | 1050 | 1047 | 1021 |
| Outlet temperature (K) | 1000 | 998 | 982 |
| Methane conversion (%) | 86.2 | 86.4 | 85.6 |

When compared with Comparative Example, Examples 1-2 showed more uniform temperature distribution with lower highest temperature and less temperature gradient although methane conversion rate was not improved a lot. There was no significant difference between Example 1 and Example 2.

Example 3

In the experimental setup of Example 1, the inlet temperature was changed to 873 K.

Example 4

In the experimental setup of Example 1, the inlet temperature was changed to 923 K.

Example 5

In the experimental setup of Example 2, the inlet temperature was changed to 873 K.

Example 6

In the experimental setup of Example 2, the inlet temperature was changed to 923 K.

Comparative Example 2

In the experimental setup of Comparative Example 1, the inlet temperature was changed to 873 K.

Comparative Example 3

In the experimental setup of Comparative Example 1, the inlet temperature was changed to 923 K.

Highest reactor temperature and methane conversion rate of Examples 3-6 and Comparative Examples 2-3 depending on the combustion catalyst filling amount are given in Table 2.

TABLE 2

|  | Example 3 | Example 4 | Example 5 | Example 6 | Comparative Example 2 | Comparative Example 3 |
|---|---|---|---|---|---|---|
| Inlet temperature (K) | 873 | 923 | 873 | 923 | 873 | 923 |
| Highest temperature (K) | 1098 | 1144 | 1138 | 1145 | 1184 | 1220 |
| Temperature at middle portion of plate (K) | 1080 | 1044 | 1067 | 1043 | 1018 | 1032 |
| Outlet temperature (K) | 1038 | 1001 | 1003 | 1000 | 978 | 994 |
| Methane conversion (%) | 80.2 | 88.3 | 84.9 | 88.4 | 84.5 | 88.4 |

Example 3, in which the inlet temperature was lower than in Example 1, showed less heat production than Comparative Example 2 because of incomplete reaction in the combustion channel and, hence, significantly lower conversion rate and temperature distribution as compared to Comparative Example 2. This should be considered when applying the present invention. In Example 5, in which the inlet temperature was the same as in Example 3, this problem was solved since the reaction was completed in the combustion channel. Examples 4-6 showed more uniform temperature distribution with lower highest temperature and less temperature gradient compared to Comparative Examples 2-3 although methane conversion rate was not significantly different.

Since the hydrocarbon reforming for producing hydrogen is an endothermic reaction and requires supply of heat to continue the reaction, a microreactor designed integrally with a heat exchanger such that heat can be supplied from a catalytic combustion occurring at the opposite side of the reforming reaction attracts attentions. The hydrocarbon reforming microreactor is associated with the hot-spot problem of local temperature increase owing to the difference in the heat of the endothermic and exothermic reactions. The high reactor temperature and temperature gradient may result in thermal deactivation of catalyst and reduced durability of materials.

The microreactor of the present invention is capable of solving the local temperature increase problem and improving reforming performance through temperature control. With superior material and heat transfer performance, it exhibits about 200 times higher productivity as compared to the existing fixed-bed reactor and provides reduced manufacturing time and cost due to decreased size and weight and improved safety. More specifically, the present invention can achieve more uniform temperature distribution throughout the combustion plate as compared to the existing art. As a result, the highest temperature of the reactor can be lowered and the temperature gradient can be decreased. By decreasing the decreased temperature gradient, the problems of degradation of catalyst, lowering of reactor durability and thermal deformation can be solved.

The hydrogen produced from the hydrocarbon reforming is widely used in the petrochemical industry. Recently, it is also used in fuel cells including PEMFC and in the Fischer-Tropsch process. That is, hydrogen is highly esteemed as a future energy source not only in the petrochemical industry but also in the PEMFCs which are viewed as the next-generation clean vehicle energy source as well as the GTL and Fischer-Tropsch processes of synthesizing liquid fuels from low-grade fuels such as coal or biomass. The market scale of hydrogen production is about 53 million tons as of 2010 and about 150 billion dollars as of 2011 and is expected to grow 5.6% annually from 2011 to 2016. Considering that the microreactor technology is still in its beginning stage and is useful in various applications, the present invention will be of great value.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A microreactor wherein an endothermic reaction and an exothermic reaction occur simultaneously, wherein a plurality of combustion catalyst-filled parts are present in a portion of an entire combustion catalyst plate and a plurality of combustion catalyst-unfilled parts are present in a remaining portion;
    wherein a combustion catalyst used to fill the plurality of combustion catalyst-filled parts present in a portion of the entire combustion catalyst plate is Pt, and wherein the plurality of combustion catalyst-filled parts and the plurality of combustion catalyst-unfilled parts exist alternatingly from a reactant inlet to a product outlet with a lattice shape.

2. A microreactor for hydrocarbon reforming including an end plate and one or more unit consisting of a combustion catalyst plate, a combustion channel plate, a reforming catalyst plate, and a reforming channel plate, wherein a plurality of combustion catalyst-filled parts are present in a portion of the entire combustion catalyst plate and a plurality of combustion catalyst-unfilled parts are present in a remaining portion;
    wherein a combustion catalyst used to fill the plurality of combustion catalyst-filled parts present in a portion of the entire combustion catalyst plate is Pt,
    wherein a reforming catalyst used to fill the reforming catalyst plate is Ni, and wherein the plurality of combustion catalyst-filled parts and the plurality of combustion catalyst-unfilled parts exist alternatingly from a reactant inlet to a product outlet with a lattice shape.

* * * * *